United States Patent
Cromer et al.

(10) Patent No.: US 7,107,460 B2
(45) Date of Patent: Sep. 12, 2006

(54) METHOD AND SYSTEM FOR SECURING ENABLEMENT ACCESS TO A DATA SECURITY DEVICE

(75) Inventors: Daryl Carvis Cromer, Apex, NC (US); Scott Thomas Elliott, Raleigh, NC (US); James Patrick Hoff, Wake Forest, NC (US); Howard Jeffrey Locker, Cary, NC (US); David Rivera, Durham, NC (US); Randall Scott Springfield, Chapel Hill, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 10/077,135

(22) Filed: Feb. 15, 2002

(65) Prior Publication Data

US 2003/0159056 A1    Aug. 21, 2003

(51) Int. Cl.
*H04L 29/02* (2006.01)
*H04L 29/18* (2006.01)
*H04L 9/34* (2006.01)

(52) U.S. Cl. ..................... 713/193; 713/167
(58) Field of Classification Search ............... 713/193
See application file for complete search history.

(56) References Cited

U.S. PATENT DOCUMENTS

| | | | |
|---|---|---|---|
| 5,257,387 A | 10/1993 | Richek et al. | |
| 5,559,993 A | 9/1996 | Elliott et al. | |
| 5,574,786 A | 11/1996 | Dayan et al. | |
| 5,692,189 A | 11/1997 | Lipe | |
| 5,787,019 A | 7/1998 | Knight et al. | |
| 5,826,007 A * | 10/1998 | Sakaki et al. | 714/42 |
| 5,987,542 A * | 11/1999 | Bang | 710/65 |
| 6,041,395 A | 3/2000 | Beelitz | |

* cited by examiner

*Primary Examiner*—Gilberto Barron
*Assistant Examiner*—Venkat Perungavoor
(74) *Attorney, Agent, or Firm*—George E. Grosser; Gregory Doudnikoff; Dillon & Yudell LLP

(57) ABSTRACT

An embedded security subsystem, and method for implementing the same, which provide secure controllability of a data security device within a data processing system. The embedded security subsystem of the present invention includes a persistent enable flag for providing control access to the data security device, wherein the persistent enable flag is accessible only in response to a power-on reset cycle of the data processing system. The persistent enable flag is read-only accessible to runtime program instructions. A pending state change flag that is write accessible by runtime program instructions is utilized for setting an intended next state of the persistent enable flag such that control access to the data security device is enabled only during a subsequent power-on reset of said data processing system.

23 Claims, 3 Drawing Sheets

METHOD AND SYSTEM FOR SECURING ENABLEMENT ACCESS TO A DATA SECURITY DEVICE

BACKGROUND OF THE INVENTION

1. Technical Field

The present invention relates in general to data processing systems, and in particular to data security within such systems. More particularly, the present invention relates to a system and method for setting a persistent data security state in a convenient manner impervious to runtime interference.

2. Description of the Related Art

Computer security encompasses a number of different aspects, from passwords and permissions, to data encryption, virus protection, firewalls, and VPNs, software bugs, data backup and physical system security. The continued growth in electronic communication and commerce over expansive computer-driven networks has resulted in a dramatic proliferation of potential security data security problems as data is stored and delivered over multiple networked devices.

Specialized security hardware that complements transmission-based security has been developed to address the myriad of potential security threats to stored and/or transmitted digital data. Such complementary hardware security addresses hardening and assuring the integrity of the environment in which digital application data resides. This security hardware can be utilized for a number of purposes including securing storage of confidential information such as security keys, and off-loading of intensive security operations such as Secure Socket Layer (SSL) processing or digital signature operations. So called "smart cards" and hardware tokens are among the most common forms of secured hardware storage. These mechanisms are tamper-resistant, preventing unauthorized access to security keys. security devices can also perform cryptographic operations solely from within a system thus providing both a secure environment to access of confidential data, as well as being able to off-load processor intensive operations from network devices.

One such hardware security device is known as an embedded security subsystem (ESS), which provides system security measures outside the interactive processing environment (i.e. the operating system). An ESS typically includes a protective enablement/disablement mechanism which serves to prevent both unauthorized access to sensitive data stored with the ESS as well as unauthorized enablement of ESS functionality. A major source of security vulnerability occurs incident to initial activation and enablement of an ESS, since such enablement signals or instructions are required when otherwise necessary authorization information (owner authentication, for example) is unavailable. ESS initialization techniques are therefore subject to unintended function disablement and/or denial of service (DoS) attacks.

The currently developed Trusted Computing Platform Alliance (TCPA) specification addresses the vulnerability of ESS enablement/activation by requiring specialized forms of user authorization. These user authorization techniques typically rely on verifying physical presence of a user before ESS enablement/activation commands are allowed to operate. For a personal computer (PC), such verification might be implemented using manual switches or buttons, or using computer startup instructions. Such physical presence verification during initial enablement of an ESS are often cumbersome and preclude remote enablement of access to the features and data associated with the object ESS.

From the foregoing, it can be appreciated that a need exists for a system that provides secure access to ESS functionality while maintaining the flexibility afforded by remote initialization and management. The present invention addresses such a need by providing a system and method that utilizes a power-on reset requirement that avoids the aforementioned problems associated with physical presence verification before a change of enablement/activation status of an ESS can be implemented.

SUMMARY OF THE INVENTION

An embedded security subsystem, and method for implementing the same, which provide secure controllability of a data security device within a data processing system are disclosed herein. The embedded security subsystem of the present invention includes a persistent enable flag for providing control access to the data security device, wherein access to the persistent enable flag is gated by a power-on reset of the host data processing system. The persistent enable flag is read-only accessible to runtime program instructions. A pending state change flag that is write accessible by runtime program instructions, is utilized for setting an intended next state of the persistent enable flag such that control access to the data security device is enabled only during a subsequent power-on reset of said data processing system. In one embodiment, the power-on reset gating mechanism is implemented utilizing a sensed power cycle evolution, wherein the embedded security subsystem sets the persistent enable flag in accordance with the current state of the pending state flag in response to detecting a re-application of switched system power to the host data processing system. In an alternate embodiment, the power-on reset gating mechanism is implemented in association with startup program instructions that set the persistent enable flag in accordance with the current state of the pending state flag that was set during a previous power cycle.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

As described with reference to FIGS. 1–3, the present invention provides a hardware security means by which enablement of a hardware security device within an embedded security subsystem (ESS) is gated by a power-on reset requirement as specified herein. The hardware device security means of the present invention is particularly useful within the context of a computer network in which it may be important to ensure that particularly sensitive data is uniquely maintained in a specified location in association with specified users (i.e. within a designated data processing system having designated users).

The hardware security enablement mechanism of the present invention may be executed in a variety of computer systems. The computer may be, for example, a personal computer, a midrange computer, a network computer or a mainframe computer. In addition, the computer may be a stand-alone system or part of a network such as a local-area network (LAN) or a wide-area network (WAN). For the purposes of illustration, a preferred embodiment of the present invention, as described below, is implemented on a personal computer such as the Netvista A40, manufactured by International Business Machines Corporation.

Figure 1:
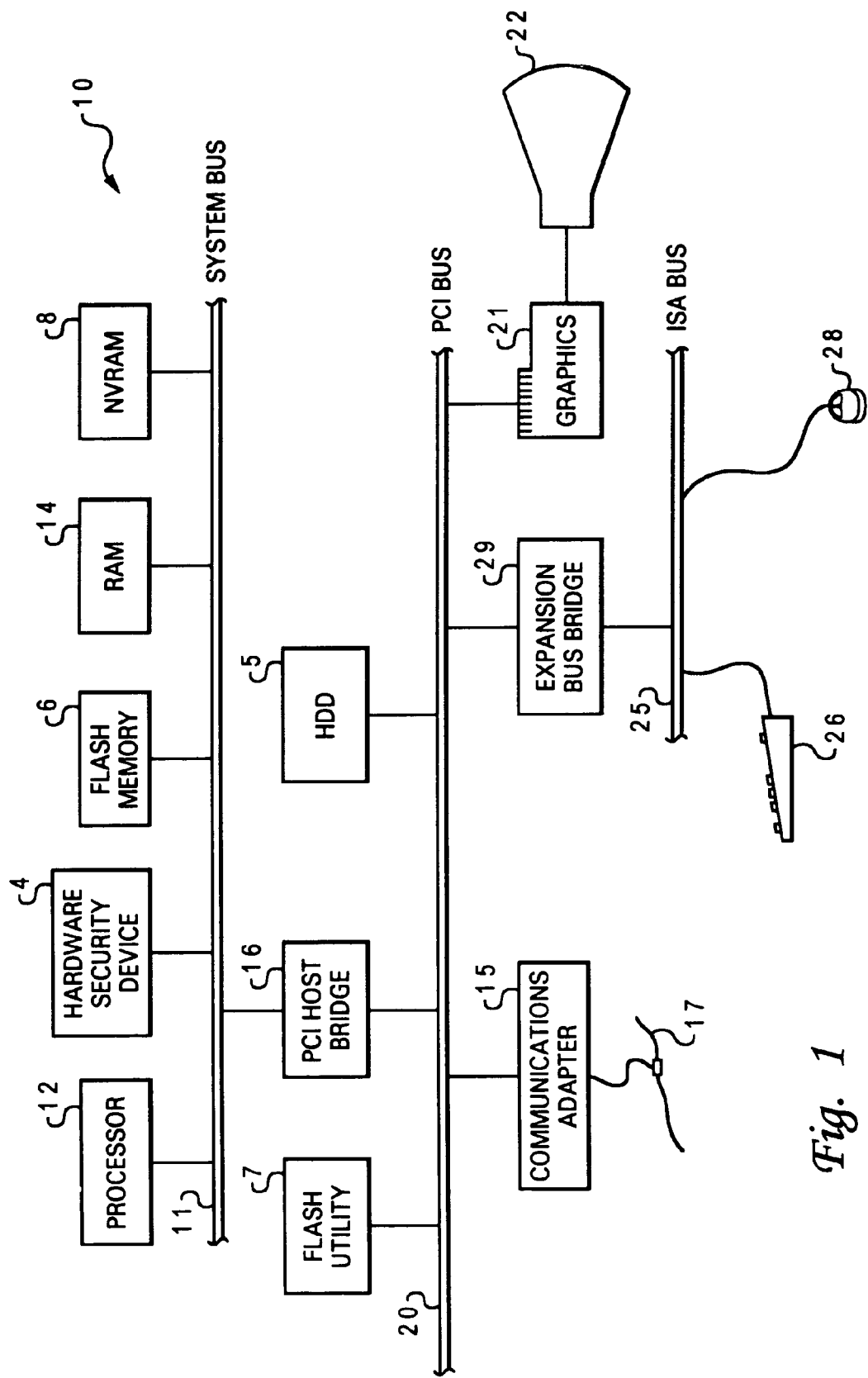
FIG. 1 depicts a block diagram of a typical computer system wherein a preferred embodiment of the present invention may be implemented.

Referring now to the drawings and in particular to FIG. 1, there is depicted a block diagram of a typical personal computer system that may be utilized to implement a preferred embodiment of the present invention. As shown, a central processing unit (CPU) 12, a flash memory 6, a Random-Access Memory (RAM) 14, a non-volatile RAM (NVRAM) 8, and a hardware security device 4, are connected to a system bus 11 of a personal computer system 10. CPU 12, RAM 14, flash memory 6, and NVRAM 8 are also coupled to a peripheral component interface (PCI) local bus 20 of personal computer system 10 through a PCI host bridge 16. Flash memory 6 is a special type of electronically erasable progammable read-only memory (EEPROM) that can be erased and reprogrammed in blocks instead of one byte at a time. PCI host bridge 16 provides a low latency path through which processor 12 may directly access PCI devices mapped anywhere within bus memory and/or input/output (I/O) address spaces. PCI host bridge 16 also provides a high bandwidth path for allowing PCI devices to directly access RAM 14.

Also attaching to PCI local bus 20 are a hard disk drive 5, a communications adapter 15, an expansion bus bridge 29, and a flash memory utility 7. Communications adapter 15 connects personal computer system 10 to a network 17. Expansion bus bridge 29, such as a PCI-to-industry standard architecture (ISA) bus bridge, may be utilized for coupling ISA bus 25 to PCI local bus 20. As shown, a keyboard 26 and a mouse 28 are attached to ISA bus 25 for performing certain basic I/O functions. A graphics adapter 21 is also attached to PCI local bus 20 for controlling visual output through display monitor 22.

In the depicted embodiment, hardware security device 4 includes a combination of hardware, firmware, and software functionality that serves to protect sensitive data stored within hardware security device 4. Alternatively, hardware security device 4 may include requisite processing functionality that provides secure portal access to sensitive data stored elsewhere within computer system 10. As explained in further detail with reference to FIGS. 2 and 3, hardware security device 4 typically includes an enablement mechanism that enables/activates the functionality resident within hardware security device 4.

Conventionally, this enable/disable mechanism consists of an "enablement flag" that is set by a user having preestablished ownership status, or during a boot process of computer system 10 when physical presence of the user is used as the security measure.

A boot process for personal computer system 10 typically includes executing a bootstrap program which performs system initialization and loads an operating system by locating and executing an operating system loader from a partition within hard disk drive 5 into system memory (i.e., RAM 14). Utilizing the operating system loader, the bootstrap program loads operating system components such as device drivers, preferably into RAM 14, and initializes operation thereby.

Preferably, the bootstrap program is stored within flash memory 6. Further portions of the bootstrap program may also be stored in any other suitable machine-readable media such as RAM 14 and other disk and/or tape drive(e.g. magnetic diskette, magnetic tape, CD-ROM, optical disk, or other suitable storage media). While flash memory 6 contains static boot programs, NVRAM 8 and hard disk drive 5 preferably contain configurable settings for the boot program to utilize. Any suitable non-volatile machine-readable media may retain the operating system loader and associated operating system(OS), such as disk drive 5 and/or tape drive(e.g. magnetic diskette, magnetic tape, CD-ROM, optical disk, or other suitable storage media). Any suitable OS such as IBM's OS/2 operating system may direct CPU 12.

In the depicted embodiment, the functionality provided by hardware security device 4 defines a "trusted subsystem" within computer system 10 with which one or more data processing systems within network 17 may communicate sensitive data via communications adapter 15. One such context in which the need for hardware data security arises is in the development and improvement of security key technologies. As part of the security management employed by credit card companies, for example, public/private security key encryption systems are often utilized. In general terms, public/private key technology is utilized for mutual user authentication (via digital signatures, for example) between otherwise unfamiliar parties. Public/private key encryption allows a vendor (a credit card company, for example) to remotely install a private key into a designated user system module in a manner that the vendor is assured that any information intended for the private use of the user is secure.

Implementation of public/private key security systems requires user-side hardware security. The Trusted Computing Platform Alliance (TCPA) is an industry consortium dedicated to improving trust and security on computing platforms. International Business Machines, Inc. (IBM) is included among the companies that founded and continue to develop TCPA specifications and guidelines. The current TCPA specification (incorporated herein by reference in its entirety) defines a subsystem so that it may be trusted to interactively operate with other systems in a pre-defined manner. The subsystem includes an isolated computing engine (e.g. hardware security device 4) whose processes can be trusted because they cannot be altered locally or via network intrusion. One such security subsystem developed in accordance with TCPA guidelines is known as a Trusted Platform Management (TPM) module. The preferred embodiments of the present invention are described herein in FIGS. 2 and 3 in the context of a data processing system employing a TPM. However, one skilled in the art will understand and appreciate that the underlying principles depicted and explained with reference to FIGS. 2 and 3 are more generally applicable to any application in which there exists a need to provide secured controllability of a dedicated hardware security device.

A major source of security vulnerability for sensitive data residing with computer system 10 occurs incident to initial activation and enablement of the security functionality within hardware security device 4, since such enablement signals or instructions are required when otherwise necessary authorization information (owner authentication, for example) is unavailable. The present invention, as implemented within the computer system depicted in FIG. 1, provides secure controllability of the hardware security enablement mechanism that reduces the risks associated with relying entirely on the power-on reset procedure to set or reset the state of a persistent enablement flag within hardware security device 4.

Figure 2:
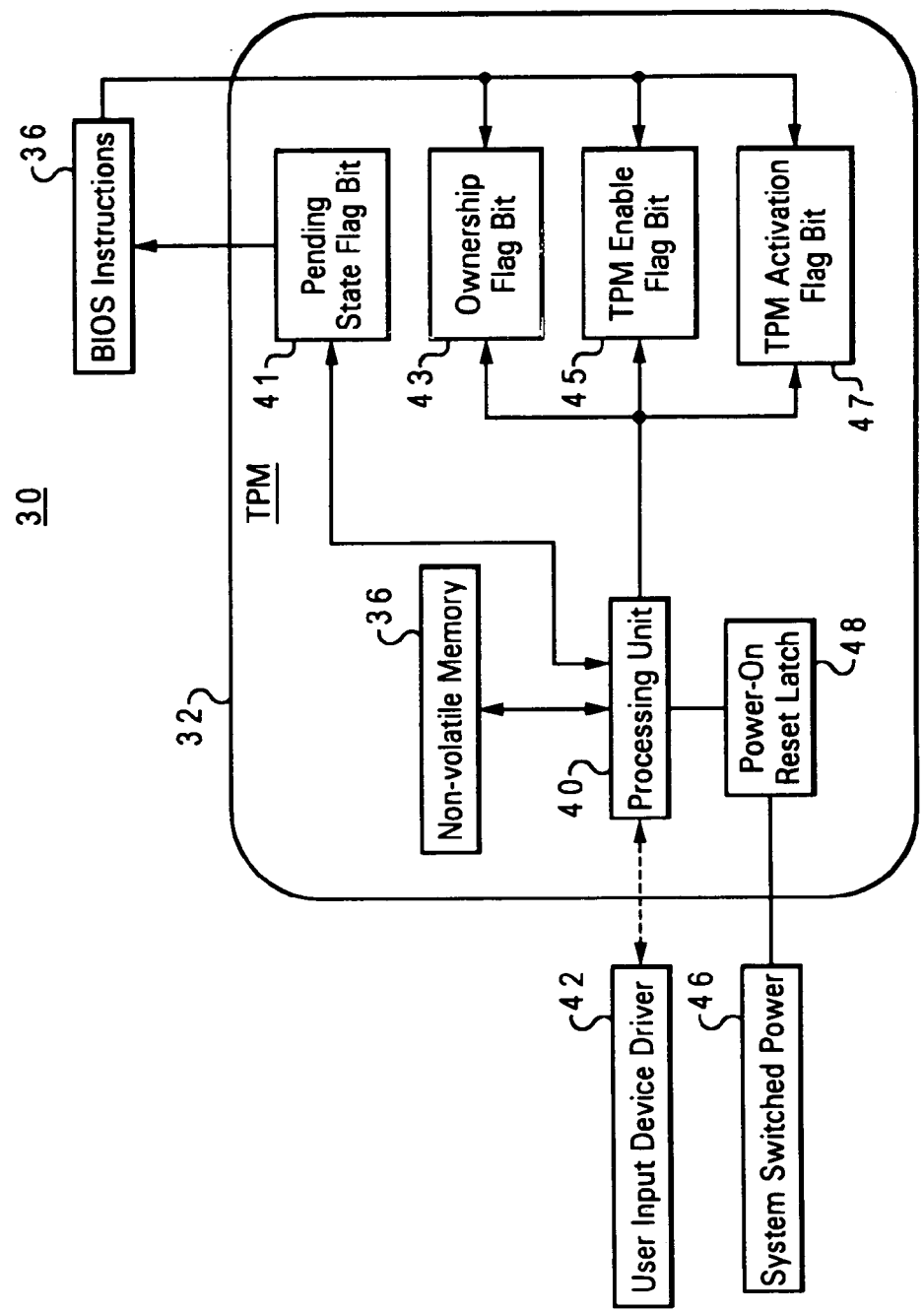
FIG. 2 is a block diagram illustrating an embedded hardware security system implemented within a data processing system in accordance with a preferred embodiment of the present invention.

Referring to FIG. 2, there is depicted a block diagram illustrating an ESS 30 implemented within a data processing system in accordance with a preferred embodiment of the present invention. As shown in FIG. 2, ESS 30 includes a TPM module 32 that serves to protect access to sensitive data stored within an internal non-volatile memory device 38. In addition, ESS 30 may be configured to provide secure access to data stored within an alternative data storage medium 42 that resides external to the physical boundaries of TPM module 32. TPM module 32 is typically an integrated circuit chip that is permanently coupled (typically soldered) to a planar (e.g. a motherboard) within computer system 10. Preferably, TPM module 32 is uniquely associated with a specified planar (not depicted) within computer system 10 such that TPM 32 is generally not transferrable to another planar.

A non-volatile memory device 38 and a processing unit 40 are included within TPM module 32 to provide a secure interactive data repository in which, for example, private security key data may be established and maintained within the host data processing platform. In accordance with a preferred embodiment, the secure data stored within non-volatile memory device 38 may be received from a remote system, such as a network server (not depicted). Processing unit 40 performs requisite data processing functions required for private key establishment and maintenance. The specifics of private key encryption and decryption are well known in the art and are not discussed herein.

The on-board/portal security functionality of TPM module 32 typically depends upon one or more control flags that are utilized to verify various data access parameters. Included among such data access parameters may be ownership authentication, and the enablement and activation states of TPM 32. The setting of such access parameters are determined by processing unit 40 which monitors the setting (i.e. set or reset) of an ownership flag bit 43, a TPM enable flag bit 45, and a TPM activation flag bit 47 (all three flags referred to alternatively as enablement flags). Since the state of persistent flags 43, 45, and 47 is essential to the reliable operation of TPM 32, all three are maintained as persistent, non-volatile bit flags.

In accordance with TCPA convention, ownership flag 43 is a non-volatile bit that which is set or reset to enable/disable the process of taking ownership of TPM 32. TPM activation flag 47 is a non-volatile bit used to activate and deactivate TPM 32 without destroying data protected therein. Activation and deactivation is subtly different from enabling and disabling TPM 32 in that an inactive TPM continues to recognize and execute more commands than does a disabled TPM. In particular, an inactive TPM does not block the enabling/disabling or taking ownership of the TPM.

The process of enabling and disabling TPM 32 uses the setting of non-volatile TPM enable flag 45. It should be noted that although strictly speaking TCPA convention sets forth a TPM "disable" flag, the function of TPM enable flag 45 as described herein is conversely equivalent. Conventionally, the TPM enable/disable flag is set or reset by one of two mechanisms. The first mechanism utilizes an owner-authenticated command that requires inputting and verifying an authorization string. The second mechanism uses commands which must be input in a manner that requires physical presence of the user at the platform. As explained in further detail hereinbelow, the present invention enhances the first, owner-authenticated, mechanism, and replaces the second, physical presence mechanism, with a power-on reset gated enable/disable mechanism.

Processing unit 40 is programmed to recognize that while TPM enable flag 45 is set (signaling enablement), the security of data stored within non-volatile memory device 38 and/or external storage medium 42 is assured, and normal processing and maintenance of the data continues. However, in response to detecting that the state of one or more of the enablement flags has changed (i.e. reset), processing unit 40 "disables" TPM 32 by becoming unresponsive to all external instructions except for a request to change the state of a pending state change flag 41. In addition, processing unit 40 may commence automatic predetermined data protection actions such as denying further access to the object data within memory devices 38 and 42, or removing the data from storage.

With control access to TPM 32 at stake, adequate security must be provided for accessing and manipulating the states of TPM enable flag 45. The present invention provides such persistent flag security with the combined utilization of pending state change flag bit 41 in conjunction with power-on reset procedures of the host data processing system. As explained in further detail hereinbelow, the present invention utilizes pending state change flag bit 41 to implement a power-on reset gating mechanism for setting or resetting TPM enable bit 45. In one embodiment of the present invention, detection of a power cycle evolution (i.e. removal and re-application of switched power to the host system) is utilized directly as the trigger for determining the state of TPM enable flag 45 in accordance with the current state of pending state flag 41. In an alternate embodiment, the power-on reset gating mechanism is implemented in association with startup program instructions that set TPM enable flag 45 in accordance with the current state of pending state flag 41 that was set during a previous power cycle. In this manner, the setting of TPM enable flag 45 does not depend on physical presence of an authorized user at the time of startup, and furthermore the system is impervious to denial of service attacks or otherwise undesirable enablement or disablement by a runtime owner-authenticated command.

As further depicted FIG. 2, ESS 30 receives input from a user input device driver 42. User input (via keyboard, mouse, touchpad, etc.) from input device driver 42 into TPM 33 is used to programmatically control (i.e. set or reset) the state of pending state change flag 41. It should be noted that access from input device driver 42 to pending state change flag 41 must be controlled in accordance with specified authorization parameters, such as verification of user identity, to maintain safeguards required to maintain the status of ESS 30 as a "trusted subsystem" with respect to other network devices. In the depicted embodiment, authorization to change the state of pending state change flag 41, if required, is enforced using an authorization string (password). If a TCPA "owner" has been established, the authorization string is used to authenticate the user as owner having authorized access to change pending state change flag 41. If no owner has been established in accordance with TCPA convention, no ownership authorization string is required to access pending state change flag 41.

As explained in further detail below, the state of pending state flag bit 41 is effectively an "intended next state" for one or more of persistent TPM enable flag 45. The effective utilization of pending state flag bit 41, as set during a current runtime interval, is realized in accordance with a subsequent power-on reset (i.e. reboot) of the host data processing system. In contrast to conventional TPM enablement techniques wherein computer startup instructions (i.e. bootstrap instructions) in conjunction with user input(s) are utilized directly to set or reset TPM enablement flags, the present invention employs a bifurcated mechanism that requires a subsequent power-on reset sequence to determine and implement an intended enablement status as set in the previous runtime interval of the host data processing system. Consequently, the determination of the state of pending state flag bit 41 protectively accessed during runtime operations and is only implemented as part of the subsequent boot process.

A boot process may be categorized as either a "cold boot", in which the host system is completely shut down and switched power is removed from the system, or a "warm boot" in which the host system is reset (i.e. data or programs in memory are erased) without subsequently removing system power, and the system is returned to a pre-determined initialized state. As explained in further detail with reference to FIGS. 2 and 3, a first embodiment of the present invention is applicable to the system power interruption incident to cold boot evolutions, while a second embodiment is applicable to either a warm or a cold boot process.

As further illustrated in FIG. 2, ESS 30 receives power from the host data processing system via a system switched power input source 46. As utilized herein, "switched power" refers to a removable power source such that applied to processing and volatile memory devices that is applied and removed from the system during a given power cycle (i.e. period between system startup). ESS 30 further includes a power-on reset state detection latch 48, which receives a signal from system switched power input source 46. Power-on reset detection latch 48 is set in response to receiving an asserted power input signal ($V_{cc}$ or $V_{dd}$) from system switched power input source 46. In accordance with the first embodiment of the present invention, processing unit 40, as part of system initialization, determines the state of power-on reset detection latch 48. In response to power-on reset detection latch 48 being set, processing unit 40 reads the state of pending state flag bit 41 and sets the state of persistent TPM enable bit 45 accordingly. In further response to power-on reset detection latch 48 being set, processing unit 40 performs a latch reset, such that the foregoing steps are performed only in response to an initial reading of power-on reset detection latch 48. In this manner, ESS 30 employs a power-on reset evolution to gate the setting of TPM enable flag 45 in accordance with the setting of pending state flag 41 in the previous power cycle.

A second embodiment of the present invention as implemented within ESS 30 will now be described, wherein the power-on reset gating mechanism is implemented in association with startup program instructions. Referring back to FIG. 1 in conjunction with FIG. 2, during the boot process of personal computer system 10, prior to the operating system (not depicted) taking over, a basic input output system (BIOS) code 36 (i.e. startup instructions) provides computer system 10 with a built-in starter kit to load and operate the rest of the software from hard disk drive 5. BIOS 36 is typically stored in flash memory 6 and is responsible for booting the computer by providing a basic set of startup instructions. The BIOS code performs all the tasks that need to be executed during a computer system startup including: power-on self-test (POST) which boots an operating system from hard disk drive 5, and providing an interface to the underlying hardware (an audio adapter 23 and graphics adapter 21, for example) for the operating system in the form of a library of interrupt handlers.

BIOS 36 first executes the POST code when it boots the computer system. The POST code is a built-in diagnostic program, normally stored within flash memory 6, which checks the hardware interfaces to ensure that all requisite hardware is present and functioning correctly before the BIOS begins the actual boot. During the boot process, POST continues with additional tests (such as memory tests for RAM 14 and NVRAM 8) as the boot process proceeds. In accordance with a second embodiment of the present invention, the POST code within BIOS 36 includes instructions for reading the state of pending state flag bit 41. In addition, BIOS 36 further includes startup instructions responsive to the determined state of pending state flag bit 41 for setting or resetting TPM enable flag bit 45 in accordance with whether or not pending state flag bit 41 is set. POST instruction execution is only performed during system power-on reset.

As described with reference to FIG. 2, the embedded security subsystem of the present invention maybe advantageously applied to subsystems developed under guidelines set forth by the TCPA, and more specifically to protection of data stored on a TPM. However, one skilled in the art will appreciate and understand the extensions necessary to extend the principles underlying the secure control access technique disclosed herein to other hardware security systems.

Figure 3:
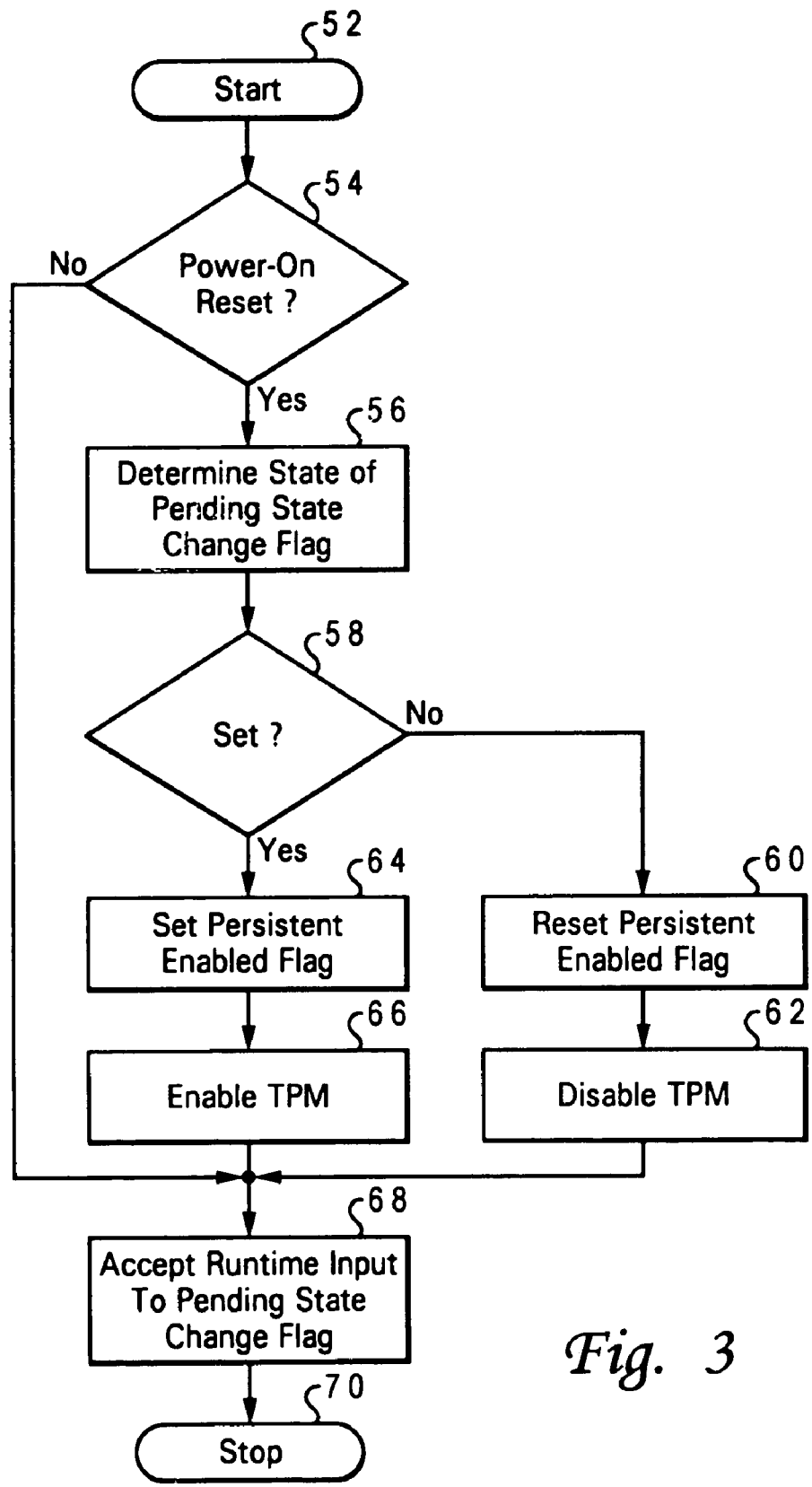
FIG. 3 is a high-level flow diagram depicting steps performed for implementing secure controllability of a data security device utilizing the embedded security subsystem depicted in FIG. 2 in accordance with a preferred embodiment of the present invention.

With reference to FIG. 3, there is illustrated a high-level flow diagram depicting steps performed for implementing secure controllability of a data security device in accordance with alternate embodiments of the present invention. As shown in FIG. 3, the process begins at step 52 and proceeds to step 54 with a determination of whether or not a power-on reset (i.e. reboot) has commenced. As explained with reference to FIG. 2, such a determination is made by either detecting the application of system power to the TPM, or as a natural consequence of access to and initiation of startup instructions such as those contained within BIOS 36. During runtime operations under control of a resident operating system (i.e. no power-on reset underway), the hardware security device (such as TPM 32) within the host data processing system accepts or denies runtime input in accordance with the state of one or more persistent enablement flags (such as TPM enable flag 45) as depicted at step 68.

When a power-on reset is commenced, the state (i.e. set or reset) of a pending state change flag is determined as illustrated at step 56. As previously explained with reference to FIG. 2, the pending state change flag is write accessible with appropriate user authorization by runtime program instructions for setting an intended next state of one or more persistent hardware security enable flags. If, as depicted at steps 58 and 60, the pending state change flag is not set (i.e. reset), the TPM processing unit resets the corresponding persistent TPM enable flag. Next, as illustrated at step 62, the hardware security device is disabled in accordance with the reset state of its enablement flag. If, however, the pending state change flag is set, the TPM processing unit sets the corresponding persistent TPM enable flag, as depicted at steps 58 and 64. As a system-specified reaction to the setting of the persistent enable flag(s), the hardware security device is enabled for runtime operations as illustrated at step 66. Runtime operations with respect to enabled or disabled access to the object hardware security device are then commenced after the power-on reset sequence as depicted at step 68 and the control access process terminates as shown at step 70.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of one or more computer systems. Until required by the computer system, the set of instructions may be stored as a computer-program product in another computer memory, for example, in a disk drive (which may include a removable memory such as an optical disk or floppy disk for eventual utilization in disk drive).

A method and system have been disclosed for providing secure controllability of a data security device within a data processing system. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An apparatus for controlling access to a data security device within a data processing system, said apparatus comprising:
    a persistent enable flag for providing control access to said data security device, wherein said persistent enable flag is write-accessible only in response to a detected power-on reset of said data processing system, and wherein said persistent enable flag is read-only accessible to runtime program instructions; and
    a pending state change flag write-accessible by runtime program instructions, for setting an intended next state of said persistent enable flag such that control access to said data security device is enabled only during a subsequent power-on reset of said data processing system.

2. The apparatus of claim 1, further comprising:
    a switched power input to said data security device;
    a power-on reset detection latch for detecting the occurrence of power applied by said switched power input; and
    means for determining the state of said power-on reset detection latch.

3. The apparatus of claim 2, further comprising means responsive to determining a set state of said power-on reset detection latch for:
    determining the state of said pending state change flag; and
    determining a next state of said persistent enable flag in accordance with the determined state of said pending state change flag.

4. The apparatus of claim 1, wherein said persistent enable flag and said pending state change flag are non-volatile storage devices.

5. The apparatus of claim 1, wherein said data security device includes memory for receiving and storing data.

6. The apparatus of claim 1, wherein said data security device includes security portal functionality for controlling access to data stored within said data processing system.

7. The apparatus of claim 1, wherein said control access to said data security device includes functionality for enabling or disabling ownership of said data security device, enabling or disabling enablement of said data security device, or enabling or disabling activation of said data security device.

8. A method for providing secure controllability of a data security device within a data processing system, said method comprising:
    responsive to detecting a power-on reset cycle initiated within said data processing system:
        determining the state of a pending state change flag wherein said pending state change flag is write-accessible by runtime program instructions for setting an intended next state of a persistent enable flag that enables or disables runtime control access to said data security device, wherein said persistent enable flag is read-only accessible to runtime program instructions; and
        setting or resetting said persistent enable flag in accordance with the state of said pending state change flag.

9. The method of claim 8, wherein said power-on reset steps are preceded by the step of setting said pending state change flag in accordance with user input during runtime operations of said data processing system.

10. The method of claim 8, further comprising, responsive to said pending state change flag being set, setting said persistent enable flag such that control access for said data security device is enabled following said power-on reset.

11. The method of claim 8, further comprising, responsive to said pending state change flag being reset, resetting said persistent enable flag such that control access for said data security device is disabled following said power-on reset.

12. The method of claim 8, wherein said power-on reset cycle includes execution of startup program instructions, said method further comprising:
    responsive to receiving user input within said data processing system, setting or resetting a state of said pending state change flag in accordance with said user input; and
    only in response to execution of said startup program instructions within said non-volatile programmable memory unit, updating said persistent enable flag to said intended state in accordance with the state of said pending state change flag.

13. The method of claim 8, wherein said data security device includes memory for receiving and storing data.

14. The method of claim 8, wherein said data security device includes security portal functionality for controlling access to data stored within said data processing system.

15. The method of claim 8, wherein said control access to said data security device includes functionality for enabling or disabling ownership of said data security device, enabling or disabling enablement of said data security device, or enabling or disabling activation of said data security device.

16. A computer-readable medium having encoded thereon computer-executable instructions for providing secure controllability of a data security device within a data processing system, said computer-executable instructions adapted for executing a method comprising:
  responsive to detecting a power-on reset cycle initiated within said data processing system:
    determining the state of a pending state change flag, wherein said pending state change flag is write-accessible by runtime program instructions for setting an intended next state of a persistent enable flag that enables or disables runtime control access to said data security device, wherein said persistent enable flag is read-only accessible to runtime program instructions; and
    setting or resetting said persistent enable flag in accordance with the state of said pending state change flag.

17. The computer-readable medium of claim 16, said method further comprising setting said pending state change flag in accordance with user input during runtime operations of said data processing system.

18. The computer-readable medium of claim 16, said method further comprising, responsive to said pending state change flag being set, setting said persistent enable flag such that control access for said data security device is enabled following said power-on reset.

19. The computer-readable medium of claim 16, said method further comprising, responsive to said pending state change flag being reset, resetting said persistent enable flag such tat control access for said data security device is disabled following said power-on reset.

20. The computer-readable medium of claim 16, wherein said power-on reset cycle includes execution of startup program instructions, said method further comprising:
  responsive to receiving user input within said data processing system setting or resetting a state of said pending state change flag in accordance with said user input; and
  responsive only to execution of said startup program instructions within said non-volatile programmable memory unit, updating said persistent enable flag to said intended state in accordance with the state of said pending state change flag.

21. The computer-readable medium of claim 16, wherein said data security device includes memory for receiving and storing data.

22. The computer-readable medium of claim 16, wherein said data security device includes security portal functionality for controlling access to data stored within said data processing system.

23. The computer-readable medium of claim 16, wherein said control access to said data security device includes functionality for enabling or disabling ownership of said data security device, enabling or disabling enablement of said data security device, or enabling or disabling activation of said data security device.

* * * * *